United States Patent Office 3,661,980
Patented May 9, 1972

3,661,980
CARBOXYLIC ESTERS OF 3-FORMYLBUTEN-(3)-OL-(1) AND THEIR PRODUCTION
Walter Himmele, Walldorf, Werner Quila, Ludwigshafen, and Richard Prinz, Waiblingen, Germany, assignors to Badische Anilin- & Soda-Fabrik Aktiengesellschaft, Ludwigshafen (Rhine), Germany
No Drawing. Filed Apr. 7, 1970, Ser. No. 26,440
Claims priority, application Germany, Apr. 12, 1969, P 19 18 695.9
Int. Cl. C07c 67/00, 69/14, 69/24
U.S. Cl. 260—488 H                                6 Claims

ABSTRACT OF THE DISCLOSURE

Production of carboxylic esters of 3-formylbuten-(3)-ol-(1) by reacting bismonocarboxylic esters of buten-(2)-diol-(1,4 with carbon monoxide and hydrogen in the presence of carbonyl complexes of rhodium at temperatures of 50° to 110° C. and pressures of 300 to 1000 atmospheres. The products are perfumes and intermediates for the manufacture of vitamin A.

---

The invention relates to carboxylic esters of 3-formyl-buten-(3)-ol-(1) and to a process for their production by the oxo (hydroformylation) reaction.

The oxo reaction is a method widely used in industry for the production of aldehydes in which olefinically unsaturated compounds are reacted with carbon monoxide and hydrogen in the presence of carbonyl complexes of Group VIII metals, for example cobalt carbonyl. A number of olefinically unsaturated compounds bearing functional groups as substituents have also been hydroformylated. Thus it is known from J. Amer. Chem. Soc., 71, 3059 (1949), that γ-acetoxybutyraldehyde can be obtained by hydroformylation from allyl acetate, α-butoxypropionaldehyde from butyl vinyl ether, ethyl β-formylbutyrate from ethyl crotonate, diethyl α-formylsuccinate from diethyl fumarate and succinyldialdehyde-1,1-diacetate from allylidene diacetate.

It was therefore to be expected that in the reaction of bismonocarboxylic esters of buten-(2)-diol-(1,4) by oxo reaction bismonocarboxylic esters of 2-formylbutanediol-(1,4) would be obtained.

It is an object of the present invention to provide a process by which hitherto inaccessible carboxylic esters of 3-formylbuten-(3)-ol-(1) are obtainable in a simple manner. Another object is to provide a process of the said kind which gives good yields. Other objects will be apparent from the following detailed description.

These objects are achieved by a process for the manufacture of carboxylic esters of 3-formylbuten-(3)-ol-(1) which comprises reacting bismonocarboxylic esters of buten-(3)-diol-(1,4) with carbon monoxide and hydrogen in the presence of a carbonyl complex of rhodium at a temperature of from 50° to 110° C. and a pressure of from 300 to 1000 atmospheres.

The new process has the advantage that hitherto inaccessible carboxylic esters of 3-formylbuten-(3)-ol-(1) can be prepared in a simple manner. Moreover the process has the advantage that it gives good yields. The process is pecular in that one molecule of acetic acid is eliminated when the formyl group is introduced.

Preferred bismonocarboxylic esters of buten-(2)-diol-(1.4) are the esters with saturated fatty acids having one to eighteen carbon atoms or benzoic acid and these may bear (as substituents) one or two alkyl or alkoxy groups having one to four carbon atoms, chlorine atoms, amino or nitro groups. Esters of lower fatty acids, particularly those having one to four carbon atoms, are especially preferred. Examples of suitable starting materials are:

butene-2-diol-1,4-diformate,
butene-2-diol-1,4-diacetate,
butene-2-diol-1,4-dipropionate,
butene-2-diol-1,4-dibutyrate,
butene-2-diol-1,4-diisobutyrate,
butene-2-diol-1,4-dipalmitate,
butene-2-diol-1,4-dibenzoate, and
butene-2-diol-1,4-p-chlorobenzoate.

Carbon monoxide and hydrogen are generally use in a volumetric ratio of 1:2 to 2:1, particularly about 1:1.
The reaction may be carried out at temperatures of from 50° to 110° C. Particularly good results are obtained by maintaining temperatures of from 70° to 100° C. The reaction is carried out at pressures of from 300 to 1000 atmospheres; pressures of from 400 to 800 atmospheres are preferably used.

The reaction is carried out in the presence of a carbonyl complex of rhodium. It is preferred to use 0.0001 to 2% by weight of rhodium calculated as metal, and with reference to the bismonocarboxylic ester of butene-2-diol-1,4 used. Amounts of from 0.001 to 0.1% by weight have proved to be particularly advantageous. It is possible to prepare the carbonyl complex separately prior to the oxo reaction or to supply the starting materials for the carbonyl complex such as halides, oxides or fatty acid salts separately to the reaction. The catalyst then forms spontaneously under the reaction conditions. It has also proved to be advantageous to use modifying agents. Examples of suitable modifying agents are phosphite of alkanols, cycloalkanols or phenols and also tri-substituted phosphines having alkyl radicals, cycloalkyl radiacls or phenyl radicals as substituents. It is advantageous to use modifying agent in such an amount that the atomic ratio of rhodium to phosphorus is from 1:1 to 1:4.

The reaction is advantageously carried out using inert solvents such as hydrocarbons, for example benzene, cyclohexane, xylene, hexane or isooctane; ethers such as diethyl ether, tetrahydrofuran or dioxane; esters such as ethyl acetate or methyl propionate; and alkanols such as methanol or n-butanol. It is preferable to use the solvent in up to fifty times the weight of the bismonocarboxylic ester of butene-2-diol-1,4.

The process according to the invention may be carried out for example by placing a bismonocarboxylic ester of a butene-2-diol-1,4 with the inert solvent and the said amount of catalyst in a high pressure vessel and reacting it with a mixture of carbon monoxide and hydrogen of the specified composition at the specified pressures and temperatures. The reaction mixture is decompressed and cooled and freed from catalyst by distillation. The carboxylic ester of 3-formylbuten-3-ol-1 is then isolated from the mixture obtained by known methods, for example by fractional distillation. Unreacted starting material may be returned to the reaction.

Vitamin A may be prepared from the carboxylic esters of 3-formylbuten-(3)-ol-(1) prepared by the process according to the invention by isomerization into β-formylcrotylacetate and reacting this the $C_{15}$ phosphonium salt according to Wittig. The lower carboxylic esters of 3-formylbuten-(3)-ol-(1) are also perfumes having novel notes.

The following examples illustrate the invention.

EXAMPLE 1

172 g. of butene-(2)-diol-(1,4) diacetate, 5 mg. of rhodium trichloride and 1 g. of dicobalt octacarbonyl are placed in a 700 ml. stainless steel rolling autoclave and oxygen is expelled from the autoclave by rinsing three times with nitrogen at a pressure of 20 atmospheres. A mixture of carbon monoxide and hydrogen in equimolar amounts is then forced in up to a pressure of 200 atmospheres, the autoclave is heated to 110° C. and the pressure is maintained at 700 atmospheres by repeated forcing in of the gas mixture. Four hours later the reaction is stopped and the reaction mixture is worked up as usual by fractional distillation.

3-formylbuten-(3)-ol-(1) acetate is obtained in a yield of 54%; the boiling point is 77° C. at 6 mm.

The 2,4-dinitrophenylhydrazone prepared in acetic acid is orange red and has a melting point of 134° C.

EXAMPLE 2

A mixture of 200 g. of butene-(2)-diol-(1,4) diacetate, 200 g. of benzene and 5 mg. of rhodium chloride is reacted at 700 atmospheres and 100° C. in the manner described in Example 1. 3-formylbuten-(3)-ol-acetate is obtained in a 72% yield.

EXAMPLE 3

40 g. of butene-(2)-diol-(1,4) dipropionate, 400 g. of benzene and 0.1 g. of anhydrous rhodium(III) chloride are placed in a stainless steel rotating autoclave and the oxygen is expelled by sweeping three times with nitrogen. An equimolar mixture of carbon monoxide and hydrogen is then forced in up to a pressure of 200 atmospheres, the autoclave is heated to 100° C. and from then on the pressure is kept at 700 atmospheres by forcing in more of the gas mixture. The reaction is stopped after five hours and the reaction mixture is worked up by fractional distillation. 14.7 g. (48% of the theory) of 3-formylbuten-(3)-ol-(1) propionate having a boiling point of 80° C. at 0.4 mm. is obtained.

We claim:

1. A carboxylic ester of a 3-formylbuten-(3)-ol-(1) having the general formula:

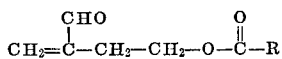

where R denotes an alkyl radical having one to four carbon atoms.

2. A process for the production of esters of 3-formylbuten-(3)-ol-(1) with a saturated fatty acid having one to eighteen carbon atoms or benzoic acid which may bear one or two alkyl or alkoxy groups having one to four carbon atoms, chlorine atoms, amino groups or nitro groups as substituents, which comprises reacting a bismonocarboxylic ester of butene-(2)-diol-(1,4) with a saturated fatty acid having one to eighteen carbon atoms or benzoic acid which may bear one or two alkyl or alkoxy groups having one to four carbon atoms, chlorine atoms, nitro groups or amino groups as substituents with carbon monoxide and hydrogen in the presence of a carbonyl complex of rhodium at a temperature of 50° to 110° C. and a pressure of 300 to 1000 atmospheres.

3. A process as claimed in claim 2 wherein a bismonocarboxylic ester of a butene-(2)-diol-(1,4) with a fatty acid having one to four carbon atoms is used as starting material.

4. A process as claimed in claim 2 wherein 0.0001 to 2% by weight of rhodium calculated as metal is used in the form of its carbonyl complex.

5. A process as claimed in claim 2 carried out at a temperature of from 70° to 100° C.

6. A process as claimed in claim 2 carried out at pressure of from 400 to 800 atmospheres.

References Cited

Chemical Abstracts, 43: 1436d, 57: 13620e, 58: 3309c, 58: 11234a.

LORRAINE A. WEINBERGER, Primary Examiner

V. GARNER, Assistant Examiner

U.S. Cl. X.R.

252—522; 260—404, 408, 410.9 N, 471 R, 473 R, 476 R, 482 R, 483, 484 R, 487, 491, 602

PO-1050
(5/69)

UNITED STATES PATENT OFFICE
CERTIFICATE OF CORRECTION

Patent No. 3,661,980          Dated May 9, 1972

Inventor(s) Walter Himmele, Werner Aquila, and Richard Prinz

It is certified that error appears in the above-identified patent and that said Letters Patent are hereby corrected as shown below:

Column 1, line 4, "Quila" should read -- Aquila --; line 17, "diol-(1,4" should read -- diol-(1,4) --; line 37, "all allyl" should read -- allyl --; line 66, "(1.4)" should read -- (1,4) --.

Column 2, line 30, "phosphite" should read -- phosphites --.

Signed and sealed this 21st day of November 1972.

(SEAL)
Attest:

EDWARD M. FLETCHER, JR.　　　　　　　　　　ROBERT GOTTSCHALK
Attesting Officer　　　　　　　　　　　　　　Commissioner of Patents